United States Patent [19]
Kress

[11] 3,878,768
[45] Apr. 22, 1975

[54] HYDROSTATIC TRANSMISSION

[76] Inventor: Herwig Kress, Klocken 5, Oberzell ub. Ravensburgh, Germany

[22] Filed: July 24, 1972

[21] Appl. No.: 274,628

[30] Foreign Application Priority Data
July 24, 1971  Germany............................ 2137113

[52] U.S. Cl......................... 92/2; 92/33; 123/46 R; 308/5 R; 417/397; 417/534
[51] Int. Cl.............................................. F01b 21/00
[58] Field of Search .................. 92/2, 31, 33, 12.2; 417/397, 534; 308/5 R; 123/46 R

[56] References Cited
UNITED STATES PATENTS
| | | | |
|---|---|---|---|
| 3,135,094 | 6/1964 | Kress | 123/46.3 X |
| 3,438,289 | 4/1969 | Kampmeier | 308/5 R X |
| 3,456,874 | 7/1969 | Graper | 417/534 X |

FOREIGN PATENTS OR APPLICATIONS
| | | | |
|---|---|---|---|
| 1,928,363 | 12/1970 | Germany | 92/31 |
| 1,905,787 | 9/1970 | Germany | 92/152 |

*Primary Examiner*—Irwin C. Cohen
*Assistant Examiner*—Abraham Hershkovitz
*Attorney, Agent, or Firm*—Walter Becker

[57] ABSTRACT

A transmission for converting reciprocating movement into rotary movement in which a cylindrical member mounted in a bore in a translatable member rotates on an eccentric axis about a stationary member. Arcuate chambers between said members are interconnected. A supply of pressure fluid to the translatable member will cause translating movement thereof and the fluid is conducted to the arcuate chambers to establish hydrostatic bearing support of the cylindrical member.

3 Claims, 2 Drawing Figures

3,878,768

HYDROSTATIC TRANSMISSION

The present invention relates to a hydrostatic transmission for converting the reciprocating movement of a piston of a prime mover into a rotary movement of the drive shaft, which includes at least one eccentric which is acted upon by the hydraulic liquid compressed by at least one piston.

A transmission of this type is known, for instance, from German Offenlegungsschrift No. 1,928,363 disclosed Dec. 10, 1970. The drawback of this arrangement, however, consists in that the pressure exerted by the hydraulic liquid upon the eccentric exerts a load upon the bearings carrying the eccentric. When this load on the bearings is not to exceed the load on the bearings as it occurs in connection with a customary connecting rod — crank — driving mechanism at the same piston force, it is necessary to select a relatively high eccentricity. If, on the other hand, for avoiding excessive housing dimensions, a small eccentricity it to be used, it is necessary for purposes of obtaining the same torque to increase the force which is exerted by the hydraulic liquid upon the eccentric. This, however, increases the load on the bearings further.

It is, therefore, an object of the present invention to provide a transmission of the above described general character by means of which the necessary torque can be conveyed at little space requirement, i.e. at small eccentricity, without exerting an undesired high load upon the bearings.

This object and other objects and advantages of the invention will appear more clearly from the following specification in connection with the accompanying drawings, in which.

Figure 1:
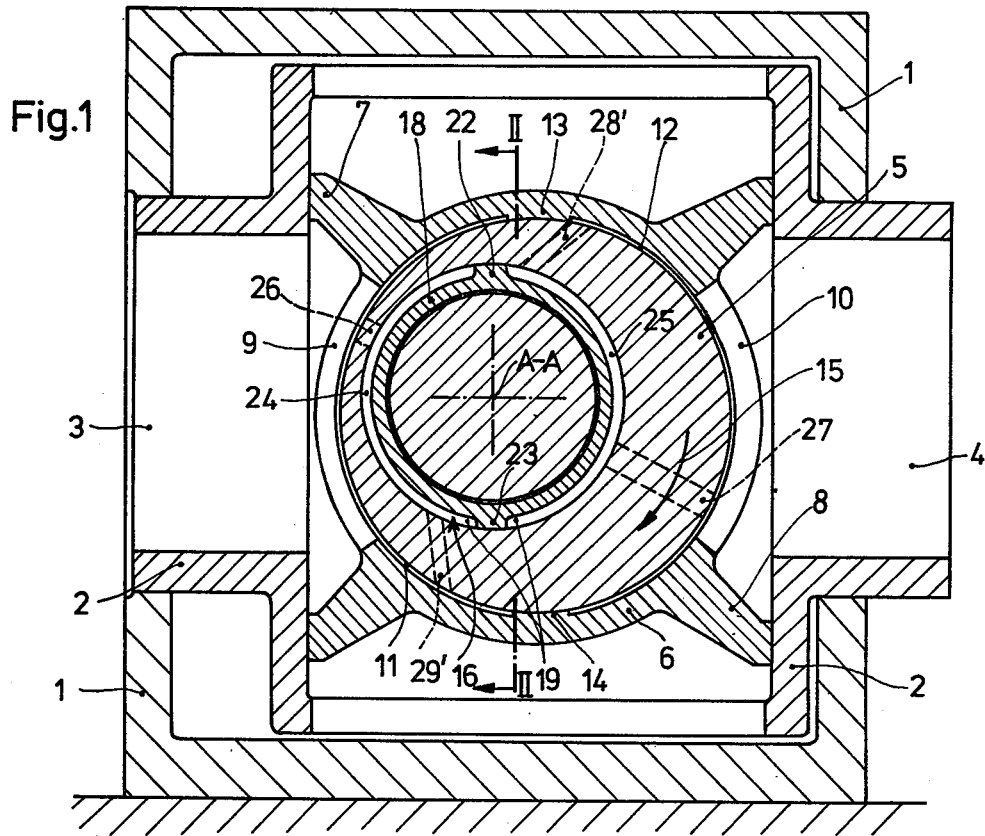
FIG. 1 represents a section through a transmission according to the invention, said section being taken perpendicularly with regard to the axis of the drive shaft.

The problem underlying the present invention has been solved by the fact that in the interior of the eccentric there is provided an annular chamber which is coaxial with regard to the axis of rotation of the eccentric and which is subdivided into a plurality of relief chambers corresponding to the number of the pressure chambers, this subdivision being effected by sealing members arranged on a stationary inner confinement. The invention is furthermore characterized in that each pressure chamber has associated therewith a relief chamber which communicates with the pressure chamber and is located in the same radial direction.

In this way, in the interior of the eccentric there is created a counter pressure surface for the surface on the circumference of the eccentric which surface is exposed to the pressure of the hydraulic liquid while the lateral forces are absorbed by the stationary inner confinement of the annular chamber.

A full compensation of the lateral forces acting upon the eccentric is obtained by the feature that the projection of each outer confining surface formed by an inner surface of the eccentric and pertaining to the respective relief chamber between the pertaining sealing members substantially equals as to surface the projection in the same direction of the confining surface formed by the circumference of the eccentric and pertaining to the respective associated pressure chamber.

According to one embodiment of the invention which is preferred with regard to the structural requirements, the inner confinement of the annular chamber is formed by a tubular stationary insert body which engages an annular groove of the eccentric which groove is coaxial with regard to the axis of rotation of the eccentric. This insert body carries on the outside the sealing members for dividing the relief chambers. An arrangement of additional auxiliary means within the annular chamber is facilitated by a stationary auxiliary shaft forming the insert body.

An application of the teaching of the German Offenlegungsschrift No. 1,903,851 disclosed Aug. 20, 1970 corresponding to U.S. Ser. No. 5675 filed Jan. 26, 1970, now U.S. Pat. No. 3,635,014-Kress issued Jan. 18, 1972 according to a preferred embodiment of the invention is made possible by individually driven control pistons for periodically varying the volume of the hydraulic liquid in each relief chamber and pertaining pressure chamber. These control pistons are coaxially arranged within the interior of the insert body. A control of all pressure chambers can be realized by causing a number of control pistons corresponding in number to the relief and pressure chambers to operate in control chambers arranged adjacent to each other in axial direction. These control chambers respectively communicate with a relief chamber. A desired control of each pressure chamber independent of the number of the pressure chambers and their association with different working pistons may be realized by driving the control pistons independently of each other.

A particular advantage of the way of arranging the control pistons in conformity with the present invention consists in that the hydraulic liquid which is discharged on that side of the control pistons which faces away from the hydraulic liquid is dischargeable through bores in the piston rods.

According to a particularly advantageous design of the present invention, the stationary insert body is for purposes of obtaining structural freedom arranged in a recess which extends over the entire axial length of the eccentric.

Referring now to the drawings in detail, the fundamental construction of a hydrostatic transmission as shown in a simplified illustration in FIG. 1 is known from German Offenlegungsschrift No. 1,928,363 noted previously. In a stationary housing 1 there is arranged a slide or member 2 which is movable in a direction perpendicular to the axis of the drive shaft. The slide member 2 is provided with openings 3, 4 for the admission of hydraulic liquid acted upon by not further illustrated pistons, the liquid being adapted to pass to the circumference of an eccentric 5. The eccentric 5 is rotatable in a frame 6 which in its turn is by means of two circular supporting ribs 7, 8 so journalled that it is able to carry out movements perpendicular with regard to the axis of the drive shaft and perpendicular with regard to the direction of movement of the slide member 2. The supporting ribs 7, 8 seal the zones around the openings 3, 4 of the valve member 2. In the region within the supporting ribs 7, 8, frame 6 has openings 9, 10 through which hydraulic liquid is adapted to pass into pressure chambers 11, 12 which are confined by the circumference of the eccentric 5 and which are separated from each other by sealing elements 13, 14 of frame 6 which form sealing ribs.

It may be assumed as known that in the illustrated position, the working piston acting upon the pressure chamber 12 is carrying out a working stroke so that hydraulic liquid in the pressure chamber 12 is under a high pressure and moves the eccentric in the direction of the arrow 15, while hydraulic liquid on that side of the eccentric which faces away from the pressure chamber 12 is conveyed through the opening 3 in the slide member 2 and during the compression stroke of the associated working piston performs work.

Figure 2:
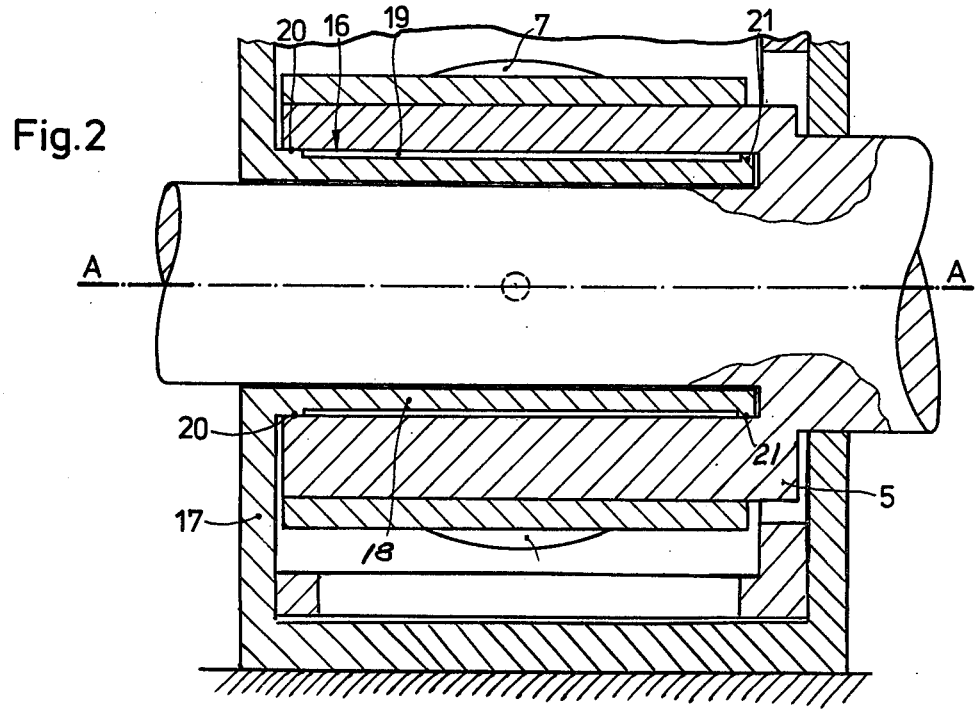
FIG. 2 is a section taken along the line II — II of FIG. 1.

As will be particularly evident from FIG. 2, the eccentric 5 has a bore 16 which is coaxial with regard to the axis of rotation of the eccentric 5. A tubular insert body 18 which is fixedly connected to a bearing bracket 17 engages the bore. The insert body 18 leaves free an annular chamber 19 toward the eccentric 5 and rests by means of sealing elements 20, 21 against the eccentric 5, the sealing elements 20, 21 forming annular sealing ribs and confining the annular chamber 19 in axial direction. By similar sealing elements 22, 23 which, however, extend in the direction of the axis of rotation A-A, the annular chamber 19 is divided into two relief chambers 24, 25 which through bores 26, 27 in the eccentric 5 communicate with the pressure chambers 11, 12 and are located in the same radial direction as the pressure chambers 11, 12 associated therewith. In this way, in the relief chambers 24, 25 there will always prevail approximately the same pressure as in the pressure chambers 11, 12 associated therewith so that by correspondingly dimensioning the surfaces it is possible without difficulty to realize that lateral forces exerted upon the eccentric 5 will be compensated for by the hydraulic liquid in the pressure chambers 11, 12. By means of additional bores 28', 29' which are arranged on the circumference of the eccentric 5 in an offset manner it will be prevented that in a rotary position of the eccentric 5 in which the bores 26 or 27 are covered up by the sealing elements 22, 23, a noticeable pressure drop will develop between the pressure chambers 11, 12 and the relief chambers 24, 25 respectively associated therewith.

It is, of course, to be understood that the present invention is, by no means, limited to the particular showing in the drawings but also comprises any modifications within the scope of the appended claims.

What is claimed is:

1. In combination with a hydrostatic transmission for converting reciprocatory movement into rotary movement: a cylindrical first member having an axial recess therein and rotatable on an eccentric axis coinciding with the axis of said recess, a second member nonrotatably mounted on the eccentric axis with radial clearance defining an annular chamber between said first and second members, first axial rib means on said second member subdividing the annular chamber between said first and second members into first chambers, a third member having a bore receiving said first member with radial clearance defining an annular space between said first and third members and second axial rib means on said third member subdividing the annular space between said first and third members into second chambers, a stationary frame, a slide nonrotatable in the frame and reciprocable therein in opposite directions, means nonrotatably supporting said third member in said slide for reciprocal movement therein in a direction perpendicular to said opposite directions during rotation of said first member on said eccentric axis, said first and second rib means being disposed in planes which are parallel to each other and to said axis, port means in opposite sides of said third member opening perpendicular to the planes of said first and second axial rib means for supplying pressure to said second chambers, and passage means in said first member connecting said second chambers to respective ones of said first chambers.

2. A hydrostatic transmission in combination according to claim 1 in which said second member is tubular and said first rib means are fixed thereto.

3. A hydrostatic transmission in combination according to claim 1 in which said recess is a bore and second member is a stationary shaft.

* * * * *